(12) United States Patent
Nasiri et al.

(10) Patent No.: US 12,587,085 B1
(45) Date of Patent: Mar. 24, 2026

(54) GRID CONNECTED THREE PHASE PV POWER CONVERSION SYSTEM UTILIZING ADAPTIVE LLC RESONANT INVERTER, HIGH FREQUENCY ISOLATION TRANSFORMER, MODULAR UNFOLDING INVERTER AND CONTROLLER

(71) Applicant: Imagen Energy, LLC, Wauwatosa, WI (US)

(72) Inventors: Adel Nasiri, Lexington, SC (US); Ezana T Mekonnen, Oak Creek, WI (US); Bruce Beihoff, Madison, WI (US); Jason S Katcha, Whitefish Bay, WI (US)

(73) Assignee: Imagen Energy, LLC, Wauwatosa, WI (US)

( * ) Notice: Subject to any disclaimer, the term of this patent is extended or adjusted under 35 U.S.C. 154(b) by 184 days.

(21) Appl. No.: 18/197,950

(22) Filed: May 16, 2023

Related U.S. Application Data

(63) Continuation of application No. 17/484,512, filed on Sep. 24, 2021, now Pat. No. 11,689,092.

(60) Provisional application No. 63/083,679, filed on Sep. 25, 2020.

(51) Int. Cl.
| | |
|---|---|
| *H02M 7/48* | (2007.01) |
| *H02M 1/00* | (2006.01) |
| *H02M 7/483* | (2007.01) |
| *H02M 3/00* | (2006.01) |
| *H02M 3/335* | (2006.01) |
| *H02M 7/493* | (2007.01) |

(52) U.S. Cl.
CPC ......... *H02M 1/007* (2021.05); *H02M 7/4807* (2013.01); *H02M 7/4815* (2021.05); *H02M 7/483* (2013.01); *H02M 1/0058* (2021.05); *H02M 3/01* (2021.05); *H02M 3/33569* (2013.01); *H02M 7/493* (2013.01)

(58) Field of Classification Search
CPC ...... H02M 1/007; H02M 1/0058; H02M 3/01; H02M 3/335; H02M 3/33569; H02M 7/4815; H02M 7/4807; H02M 7/483; H02M 7/493
See application file for complete search history.

(56) References Cited

U.S. PATENT DOCUMENTS

| | | | | |
|---|---|---|---|---|
| 11,689,092 B1* | 6/2023 | Nasiri | .................... | H02M 1/007 |
| | | | | 363/21.03 |
| 2012/0300524 A1* | 11/2012 | Fornage | ................ | H02M 5/297 |
| | | | | 363/132 |
| 2014/0334190 A1* | 11/2014 | Zhang | ................. | H02M 3/3376 |
| | | | | 363/17 |
| 2017/0104422 A1* | 4/2017 | Okumura | ............ | H02M 7/4807 |
| 2017/0187303 A1* | 6/2017 | Raboni | .................... | H02M 1/32 |
| 2020/0403496 A1* | 12/2020 | Zhao | ................. | H02M 3/33573 |

* cited by examiner

*Primary Examiner* — Gary L Laxton
(74) *Attorney, Agent, or Firm* — Lisa M. Gehrke; Gehrke & Associates, SC

(57) ABSTRACT

A power conversion system comprising, three full wave LLC resonant converters each of which has an associated high frequency isolation transformer, a full wave rectifier and an unfolding inverter, to provide a direct connection to a Medium Voltage (MV) three-phase grid for a high power photovoltaic system.

5 Claims, 8 Drawing Sheets

(25)

GRID CONNECTED THREE PHASE PV POWER CONVERSION SYSTEM UTILIZING ADAPTIVE LLC RESONANT INVERTER, HIGH FREQUENCY ISOLATION TRANSFORMER, MODULAR UNFOLDING INVERTER AND CONTROLLER

CROSS REFERENCE TO RELATED APPLICATION

This application claims priority to U.S. Ser. No. 17/484,512, filed on Sep. 24, 2021, which claims priority to provisional application U.S. 63/083,679, filed on Sep. 25, 2020, both of which are herein incorporated by reference.

FIELD OF INVENTION

The present disclosure relates to LLC resonant inverters, high frequency isolation transformers, grid connected inverters, power conversion and photovoltaic (PV) power conversion.

BACKGROUND OF INVENTION

The voltage source inverters (VSIs) are commonly used in grid-connected inverter applications. Transformers have been an essential component of the grid connected VSI inverters to fulfill the voltage matching and isolation requirements. Initial studies show that line frequency transformers (LFTs) are used at the output of the grid connected voltage source inverters (VSIs) for this aim. However, these transformers increase the cost, weight and size of the system and decrease its efficiency. Therefore, especially in low power applications such as micro-inverters or AC-module inverters, high frequency transformers (HFTs) embedded in DC-DC converters are used instead of the LFTs. This topology is also called a high-frequency-link inverter. The topology with HFT is considered to be superior to the LFT one. In addition to providing the same advantages as the LFT, it also decreases the size and weight of the converter and improves the overall efficiency of the system. In micro-inverters, several converter topologies and soft switching methods have been proposed for the DC-DC converter stage to improve the efficiency.

Isolated unidirectional or isolated bidirectional DC-DC converters have been commonly used and investigated for this inverter topology. A conventional phase-shift full-bridge (PSFB) converter provides galvanic isolation and zero voltage-switching (ZVS) without any additional components. However, narrow ZVS range for the lagging leg and higher circulating current values especially for variable load conditions limits the improvements in power density and efficiency.

Dual active bridge (DAB) converters have become popular technology with their higher power capability, lower filter requirement, and ease of realizing soft-switching features. The direction and amount of power can be easily controlled by controlling the phase-shift between the primary and secondary port voltages. However, this method results in higher circulating currents and narrows the ZVS region. Although different modulation schemes have been proposed to overcome these problems; such as the trapezoidal and triangular modulation, these methods cannot resolve all the problems at once. Moreover, combining these modulation schemes makes the control algorithm too complex with many parameters to handle.

The LLC resonant converters have been designed and used for different applications such as LED power supplies, battery chargers, server power supplies, consumer electronics, and renewable energy systems. They provide natural ZVS for primary side switches and zero-current-switching (ZCS) features. In addition, circulating current of this converter can be controlled by proper design of the magnetizing inductor. The output voltage of the LLC resonant converter is a function of the switching frequency. Therefore, frequency modulation is commonly used in LLC converter applications. It can operate in buck mode and boost mode while being dependent on the switching frequency. The phase-shift control is another control strategy applied to the LLC resonant converters. In this strategy, another gain which affects the input voltage amplitude is introduced and controlled in order to control the output voltage. Although it provides additional control degrees of freedom, the ZVS region and the analysis of the system is different from the frequency modulation case. Therefore, in the past, the phase-shift control method is generally applied to improve the startup or to keep the switching frequency constant at optimum value or in a limited range.

The high frequency switching requirement of the VSI limits its applicable power and voltage levels. medium voltage (MV) penetration of PV systems has become increasingly common with the climbing power levels of the PV systems. However, in this high-frequency-link inverter topology, the isolated DCDC converter is controlled to generate a DC voltage at the DC link and the VSI generates the AC output voltage and current.

The high-frequency-link inverters employing multilevel inverters have been also investigated to remove LFTs and increase the power density in MV penetration of high power renewable energy plants. Different modular multilevel high frequency-link inverter topologies have been investigated because of the semiconductor switch voltage and current limitations. However, the higher number of switches has negative effects on the reliability and efficiency of the system. In addition, the requirement of additional capacitors, inductors, complicated control schemes, and/or balancing circuits, makes the system more complex to deal with.

SUMMARY OF THE INVENTION

The present application discloses a three phase power conversion system utilizing a new topology for a grid-connected solar PV inverter. The disclosed topology employs an LLC resonant converter with high frequency isolation transformer in the DC-DC stage. The DC-DC converter stage is controlled to generate a rectified sine wave voltage and current at the line frequency. An unfolder inverter interfaces between this DC stage and the grid. Both phase-shift and frequency control methods are used to control the LLC resonant converter. The switching frequency is determined depending on the phase-shift angle to extend the zero-voltage switching (ZVS) region. The transformer leakage and magnetization inductances are also properly designed to provide ZVS for wide operation area. The LLC converter operates in the ZVS region, except for the narrow band around the zero-crossings of the inverter output current. Since the LLC resonant converter has a high frequency transformer, the line frequency transformer requirement is eliminated, and thus a more compact and efficient design is obtained.

The main advantages of the system are:

Higher power density;

Higher efficiency utilizing ZVS and ZCS capabilities of the LLC resonant converter and low switching losses of the line frequency unfolder circuit;

Decreased switching losses utilizing high frequency LLC resonant converters;

Grid transformer isolation;

Smaller size;

Isolation with the replacement of the low frequency isolation transformer(s) with smaller high frequency transformers resulting in lower transformer core losses and transformer grid isolation when operation has stopped;

Lower cost; and,

Lower line harmonics due to high PWM switching frequency.

Together the LLC resonant converter combined with a high frequency transformer, provide photo-voltaic regenerative applications, an isolated direct line connection with a single high frequency modulation stage, low power line harmonics, high efficiency, responsive control, and low cost.

DETAILED DESCRIPTION OF INVENTION

The power conversion system disclosed in the present application provides a novel topology that provides direct connection to an MV grid, which is essential in large scale PV systems. It includes three single phase units, each of which includes an unfolder inverter circuit and an LLC resonant converter. The main advantages offered by this system are higher power density and efficiency as compared to conventional three-phase or single-phase solar photovoltaic inverters that require galvanic isolation. This topology provides significant improvement in the total size and power density of the system by replacing the LFT with a compact HFT. In addition, this system provides important efficiency improvements by decreasing the switching losses and core losses. Also, since the transformer is part of the inverter, when the PV system is not working (e.g. at night), the transformer is not connected to the grid and does not cause any power consumption.

Figure 1:
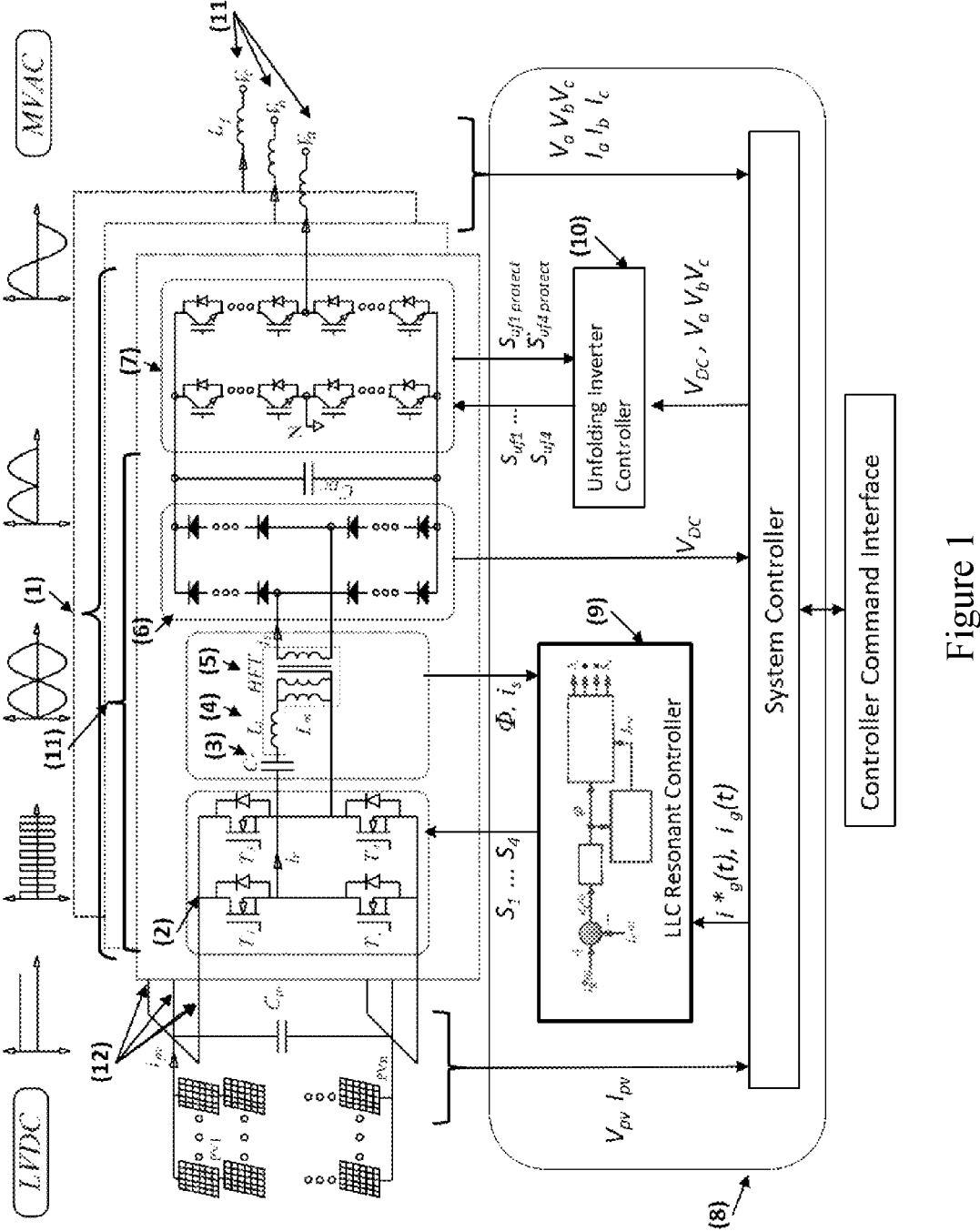
FIG. 1 is a schematic of embodiment I; PV Inverter System; Controller | Power Structure Configuration and Primary Signal Flow.

The power conversion system comprises, three full wave LLC resonant converters each of which has an associated high frequency isolation transformer, a full wave rectifier and an unfolding inverter, to provide a direct connection to a Medium Voltage (MV) three-phase grid for a high power photovoltaic system. As shown in FIG. 1, each of the LLC resonant converters (1) provides a single phase of the three phase system and is comprised of a full bridge inverter (2), resonant capacitor (3), a resonant inductor (4) integrated into the primary of a low voltage to medium voltage isolation transformer (5), a full bridge diode rectifier (6), and an unfolding inverter (7). A System Controller (8) including an adaptive PI LLC Inverter Controller (9) generates a rectified sine wave voltage and current at the output DC bus and an unfolding inverter controller (10) operating at twice line frequency, which is used to connect to the AC lines, as shown in FIG. 1.

The System Controller (8), as shown in FIG. 1, operates each LLC resonant converter switching frequency and unfolding inverter to match the voltage, phase, and frequency of the medium voltage grid.

Referring again to FIG. 1, although other configurations are possible, the preferred implementation connects all the PV modules to each single phase of the LLC resonant converter, which provides a reduction in the PV ripple current and provides a simpler means of maximum power point tracking. Both buck and boost modes of operation are possible. The system includes three high frequency LLC resonant converters, each of which comprises an associated high-frequency transformer, rectifier (1), and unfolding circuit that provides a direct connection to a three phase medium voltage grid (11).

Still referring to FIG. 1, a photovoltaic source is connected to a bus capacitor as a DC power source input. The DC power input is then connected to each of three LLC resonant converters (1) at a corresponding H bridge inverter DC bus connection (12). Each resonant LLC converter output is then connected to the medium voltage grid (11). The PV Inverter circuit shown is a preferred embodiment, however this system topology enables many other embodiments.

Figure 2:
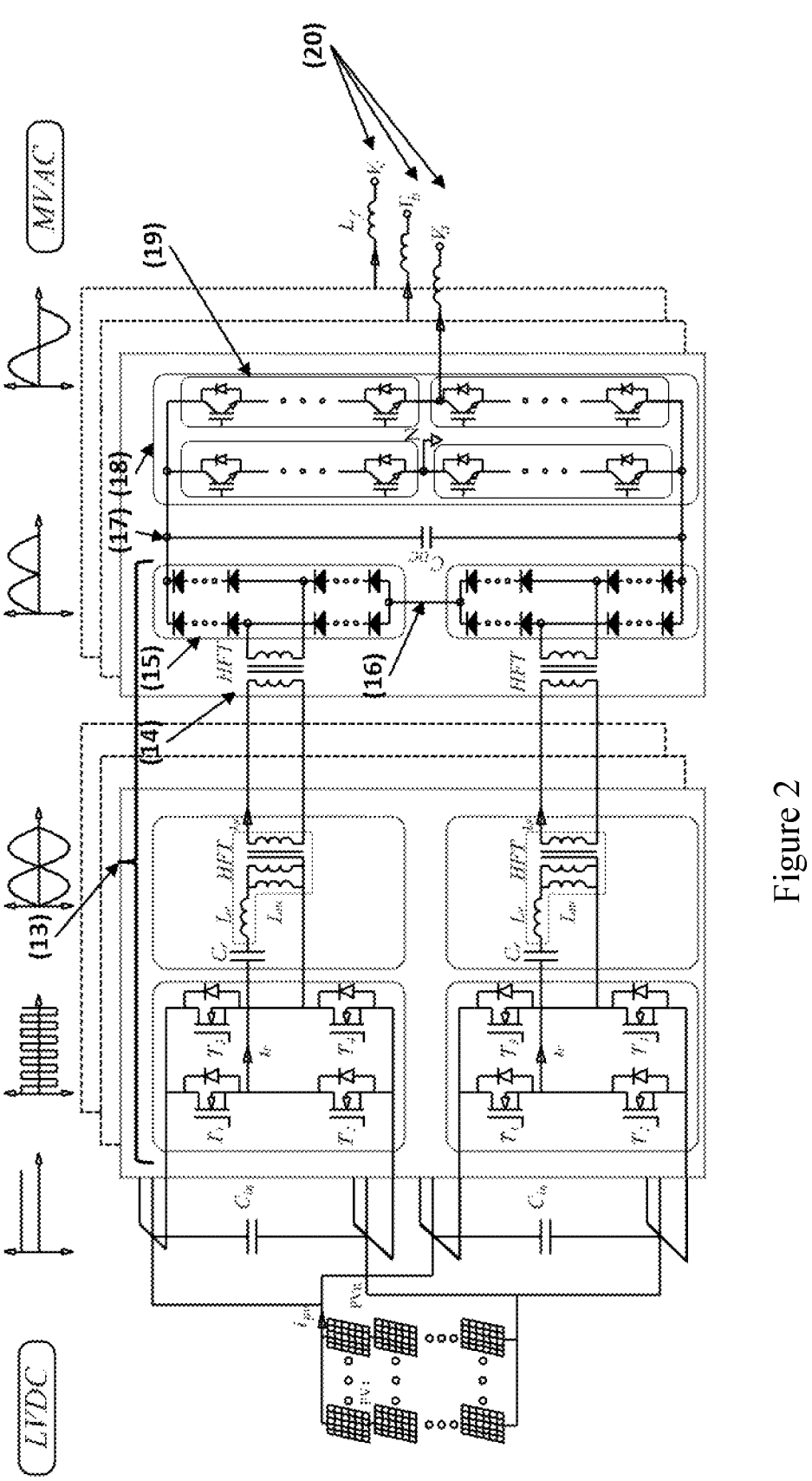
FIG. 2 is a schematic of embodiment II; PV Inverter System; Controller | Power Structure Configuration.

Referring to FIG. 2, the flexibility of the fundamental control and power architecture as described enables alternative embodiments (Embodiment II) without major changes in control algorithms or system design. In addition, no major loss of system wide efficiency or system robustness is presented by this adaptation. This adaptability further enhances the ability to produce cost effective larger voltage boost ratios, DC source to grid, through the use of optimum sized building blocks, multiple transformer stages, and easily achieved parallel-series connections. More specifically, FIG. 2 shows an embodiment that demonstrates all of these functional and structural capabilities. This alternative embodiment is derived by connecting the DC PV feeds to a parallel configuration of a plurality of single phase assemblies composed of LLC Resonant DC-DC Stages (13). Each associated transformer secondary includes a second stage high frequency transformer HFT (14) inserted between the resonant HFT and a rectifier section (15). The rectifier section associated with each of the parallel connected HFT's and their second stage HFT, are then connected in series (16) and the higher voltage DC bus thus created (17), is connected to an unfolder inverter (18) including one or a plurality of power switches capable of unfolding higher DC voltage to a higher grid voltage. The unfolding bridge inverter is comprised of four switches (19), which are switching at twice the grid frequency. These four switches, operate alternatively and follow the sine wave voltage phase shift to regulate the current into the utility grid. Because of the low frequency commutation and adaptive controllers' capability of adjusting for any switch characteristic these individual four switches are variable to include series/ parallel combinations of lower voltage devices configured to operate at higher grid line voltages and extremely high currents. These device combinations include but are not limited to IGBT, MosFET, GTO of Silicon, Silicon Carbide, Gallium Arsenide, and other existing and future semiconductor material systems. The embodied single phase assemblies are then connected in three phase arrangements to provide grid power (20).

Figure 3:
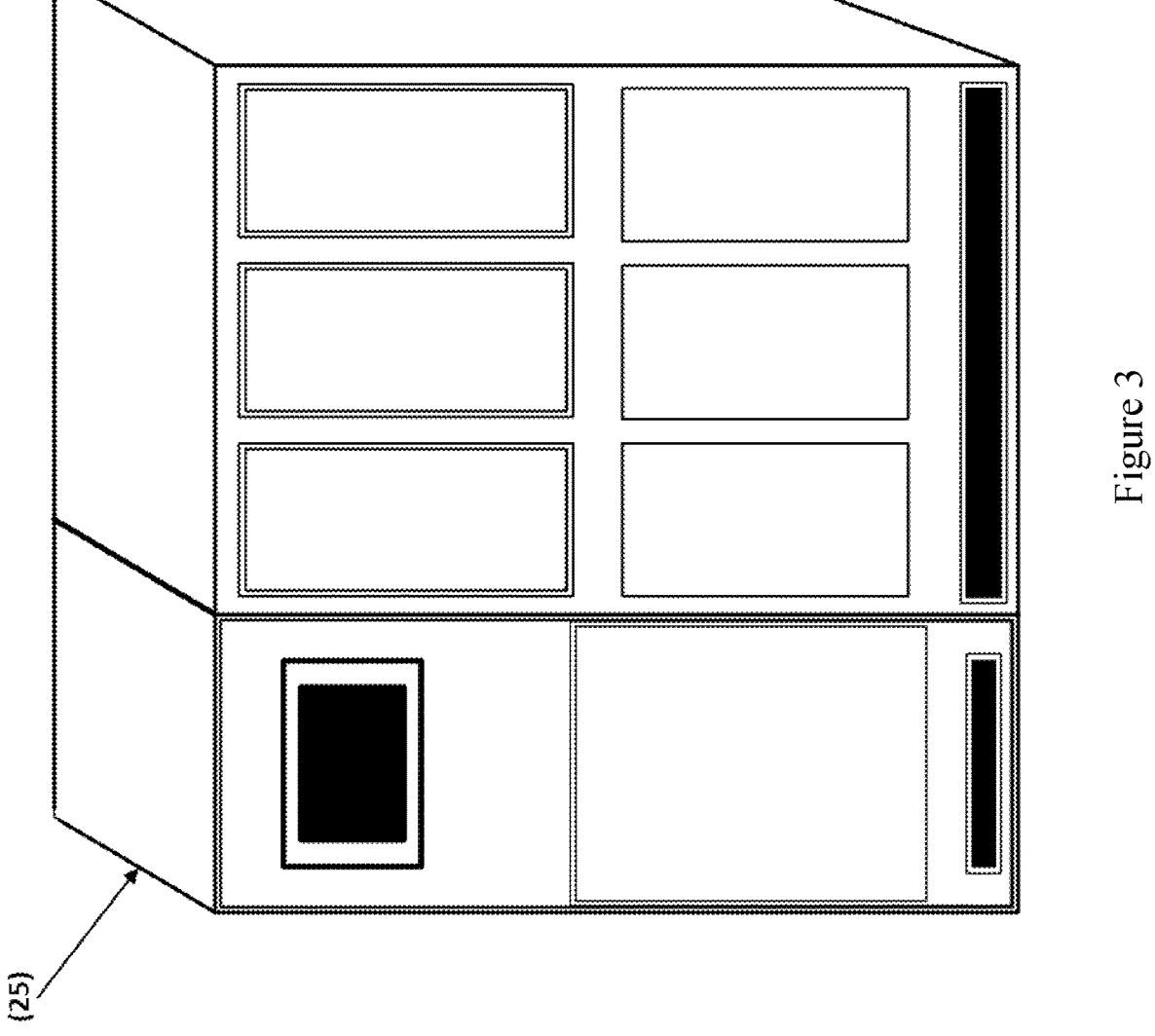
FIG. 3 depicts an example housing for System Embodiment I or II.

FIG. 3 provides to an example of the external housing (25) of the PV Inverter, which is adaptable to accommodate variations in embodiments and relative positioning of the MV unfolders (A to C), PV converter structures (A to C), and MV switchgear within it.

Furthermore, the topology is highly scalable without major modification to functional control or component reconfiguration and utilizes easily achievable parameter ranges. Typical system parameters for two system applications that span a number of real world applications is shown in Table 1 and demonstrates the flexibility of the system architecture in operation.

The effect of the transformer magnetizing inductance and load level determine which resonant frequency is dominant.

The resonant tank impedance can be rewritten by substituting values as:

$$z_{in} = \sqrt{L_r C_r} \left\{ \left( \frac{f_n^2 Q}{L_n^2 + f_n^2 Q^2} \right) + j \left( \frac{f_n L_n}{L_n^2 + f_n^2 Q^2} - \frac{1 - f_n^2}{f_n} \right) \right\}$$

Where fn is the normalized frequency given as $f_n = f_s/f_{r1}$ $L_n$ is the normalized inductance value calculated as $L_n = L_r/L_m$, and Q is the Quality factor calculated as $Q = \mathrm{sqrt}(L_r/C_r)/R_{oc}$, where $R_{oc}$ represents the transformer core losses.

The voltage gain, M, of the LLC resonant converter is given by:

$$M((Q, m, f_n)) = \frac{f_n^2 (m-1)}{\sqrt{\left(m f_n^2 - 1\right)^2 + f_n^2 \left(f_n^2 - 1\right)^2 (m-1)^2 Q^2}}$$

where $m = (L_m + L_r)/L_r$ and $f_n = f_s/f_{r1}$, the inductance factor and normalized frequency respectively. As seen by the voltage

TABLE 1

| Typical System Operating Parameters | | | | | | | |
|---|---|---|---|---|---|---|---|
| System Rating [KW] | Input V [VDC] | Input I [Amp DC] | Output V [VAC] | Output I [Amp AC] | $f_s$ [KHZ] | $\phi$ [Rad] | $\varepsilon$ [% Eff.] |
| 250-750 | 380 | 500-1900 | 4160 | 30-100 | 30-50 | 0-2.8 | 99.4 |
| 1000-2000 | 1000 | 1000-2000 | 4160-7200 | 250-500 | 30-40 | 0-2.8 | 98.9 |

Figure 4:
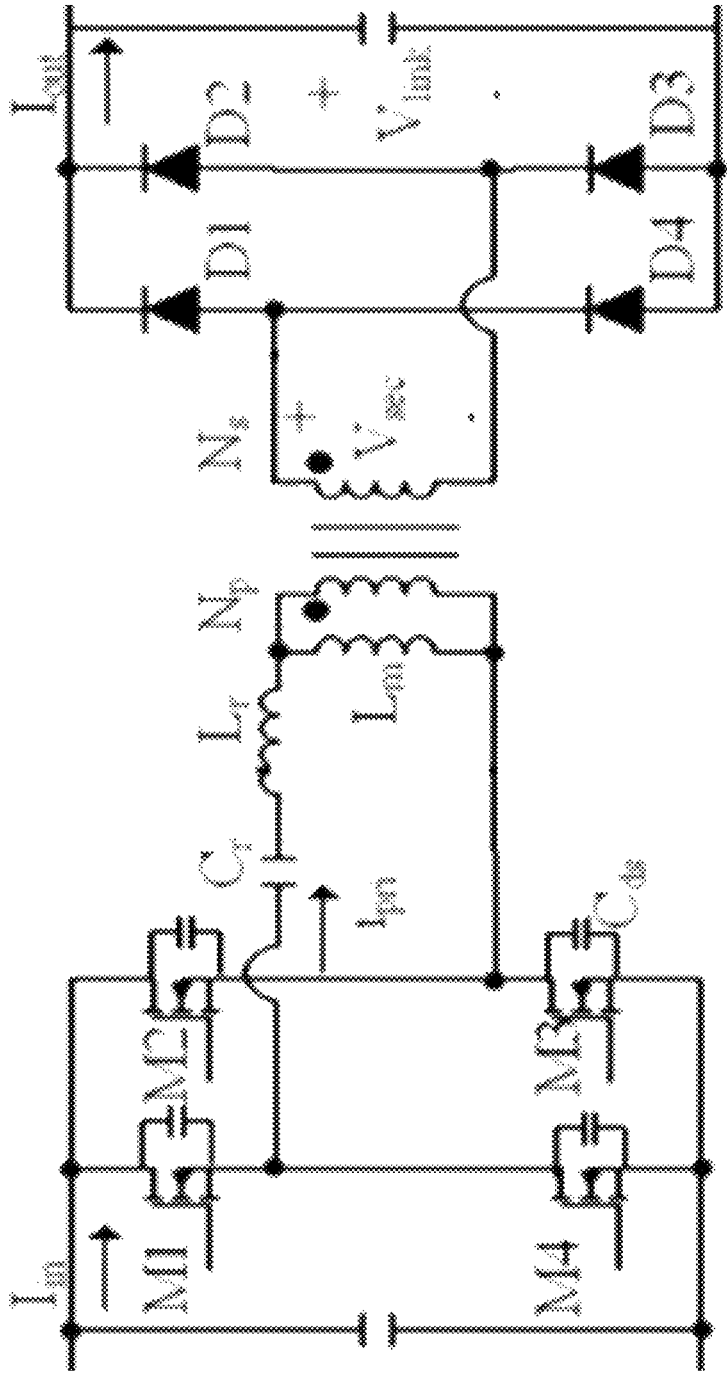
FIG. 4 is a focused schematic of a full wave LLC resonant DC-DC converter function, as shown in FIG. 1.

The major adaptive power control function is provided by the LLC Resonant DC-DC stage comprising elements (1) through (6) in FIG. 1 and expanded in FIG. 4.

Referring now to FIG. 4, when energy is being transferred from the primary side to the secondary side of the isolation transformer the L, and C, resonate at $f_{r1}$ given as:

$$f_{r1} = \frac{1}{\left( 2\pi \sqrt{L_r C_r} \right)}$$

the first resonant frequency.

Based on the First Harmonic Approximate method the transformer secondary voltage, vo'(t), is:

$$v_o'(t) = \frac{4 V_{in}}{\pi} \sin(\omega_r t).$$

When the transferred energy is zero, Lm and Lr are serially connected and resonant with the value of Cr. In this operational mode, a second resonant frequency fr2 is given by:

$$f_{r2} = \frac{1}{\left( 2\pi \sqrt{(L_r + L_m) C_r} \right)}.$$

gain equation for a given design, the voltage gain of the LLC resonant converter is only related to the load level and the switching frequency.

Figure 5:
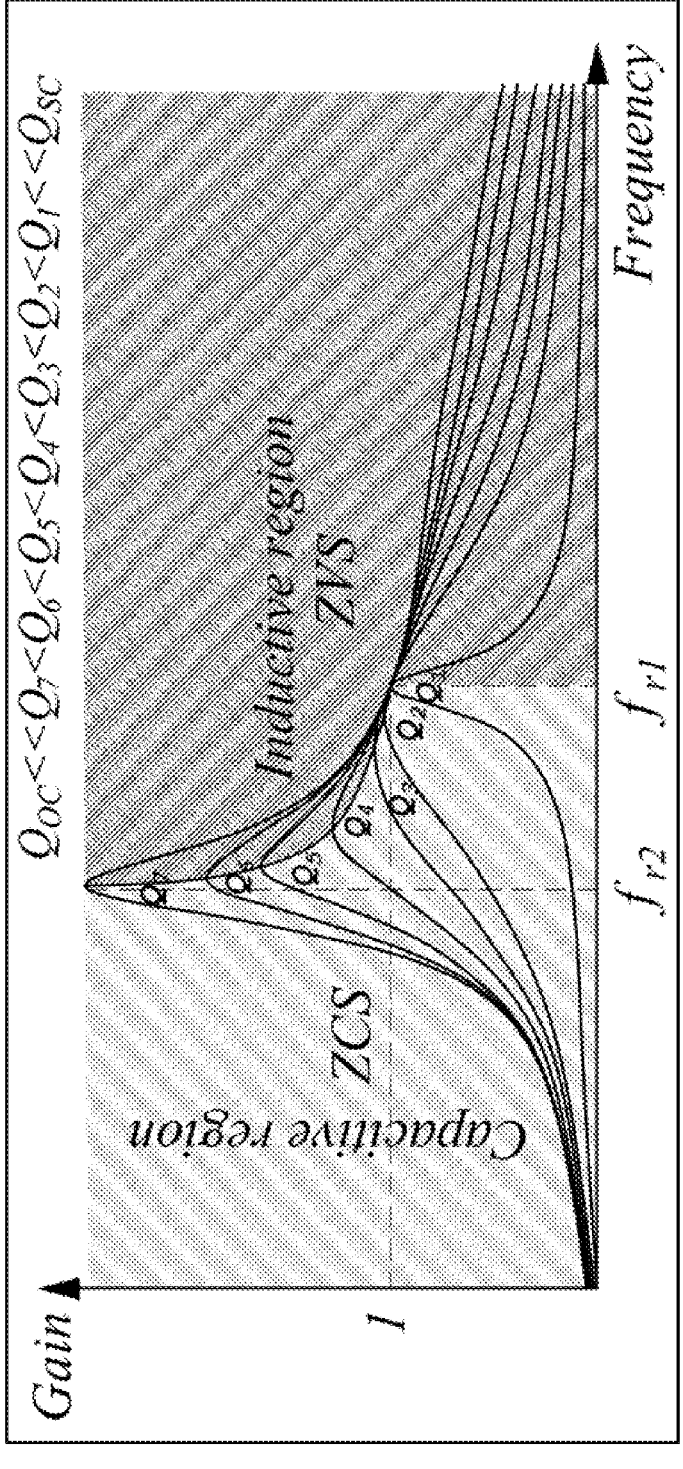
FIG. 5 is a graph presenting gain variation versus normalized frequency for different Q related to PV system load values.

Referring to FIG. 5, the gain of the LLC resonant DC converter versus switching frequency is shown. Operating the LLC resonant converter in zero voltage switching (ZVS) mode results in a lower power loss for the primary switches When in operation, the LLC resonant converter is controlled to generate a rectified sine wave voltage and current at the DC bus. The link capacitor removes the high frequency components, and the unfolder inverter creates the line frequency AC component by operating at twice line frequency avoiding high frequency switching at medium voltage.

A hybrid modulation scheme combines frequency modulation and phase-shift modulation to control the LLC resonant converter voltage and current and to generate a rectified sinusoidal output at the DC bus from the isolation transformer secondary.

Since the output voltage of the LLC resonant converter is a function of the switching frequency, it is often used for LLC resonant converter control. Phase-shift is another control strategy used with resonant converters where a phase-shift is applied between the full bridge inverter legs to provide gain control independent of the switching frequency. The gain can be controlled between 0 and 1 with phase-shift control.

The present design utilizes switching frequency control combined with phase-shift control, thereby enabling the limiting of maximum switching frequency and providing a wider range to select optimal magnetizing inductance. The phase-shift angle is obtained by using a linear equation of the generated solar PV current (from zero to 100%) and the output voltage is regulated by frequency modulation.

One of the major advantages of the LLC resonant converter is providing inherent zero voltage switching (ZVS) turn-on for the primary side switches where ZVS provides minimum switching losses and results in increased efficiency of the LLC converter. To achieve ZVS for frequency modulation control, the switch and parasitic capacitances should be discharged during its dead time. This provides a first constraint of ZVS requiring inductive resonant current. This results in an impedance angle of the resonant tank of:

$$\theta = \arctan\left[-\frac{f_n^4 Q^2 + f_n^2 L_n^2 + f_n^2 L_n - f_n^2 Q^2 - L_n^2}{f_n^3 Q}\right]$$

The second constraint is related to the dead time and transformer magnetizing current. Here the magnetizing current must be high enough to discharge the capacitances during the dead time to maintain ZVS operation. Also noting that higher transformer magnetizing current needs to be traded off with increasing circulating current and losses. The second condition to achieve ZVS in terms of switch and parasitic capacitances and magnetizing current is given as:

$$Q_m \geq 2C_{prio_s}V_{in} + (C_{stray} + C_W)V_{in} + \frac{1}{n}C_{seco_s}2V_o$$

where $Q_m$ is the charge provided by the magnetizing current, $C_{prios}$ is the primary side devices' output capacitance, $C_{secos}$ is the secondary side devices' output capacitance, n is the transformer turns ratio, $C_{stray}$ and $C_W$ are the stray capacitance of the printed circuit board (PCB) layout and winding capacitance of the transformer respectively.

The charge provided by the transformer magnetizing current is:

$$Q_m = I_{Lmpk}(V_{in})t_d$$

where $I_{Lmpk}$ is the peak value of the magnetizing current, $V_{in}$ is the input voltage, and $t_d$ is the deadtime. Also, $I_{Lmpk}(V_{in})$ is given by:

$$I_{Lm_{pk}}(V_{in}) = \frac{1}{2}\frac{\dfrac{V_{in}}{4}\dfrac{T_d}{2}}{L_m} = \frac{V_{in}}{16L_m f_{r1}}$$

Then the required deadtime is given by:

$$t_{d_{required}} = \frac{16L_m f_{r1} Q_m}{V_{in}}$$

Figure 6:
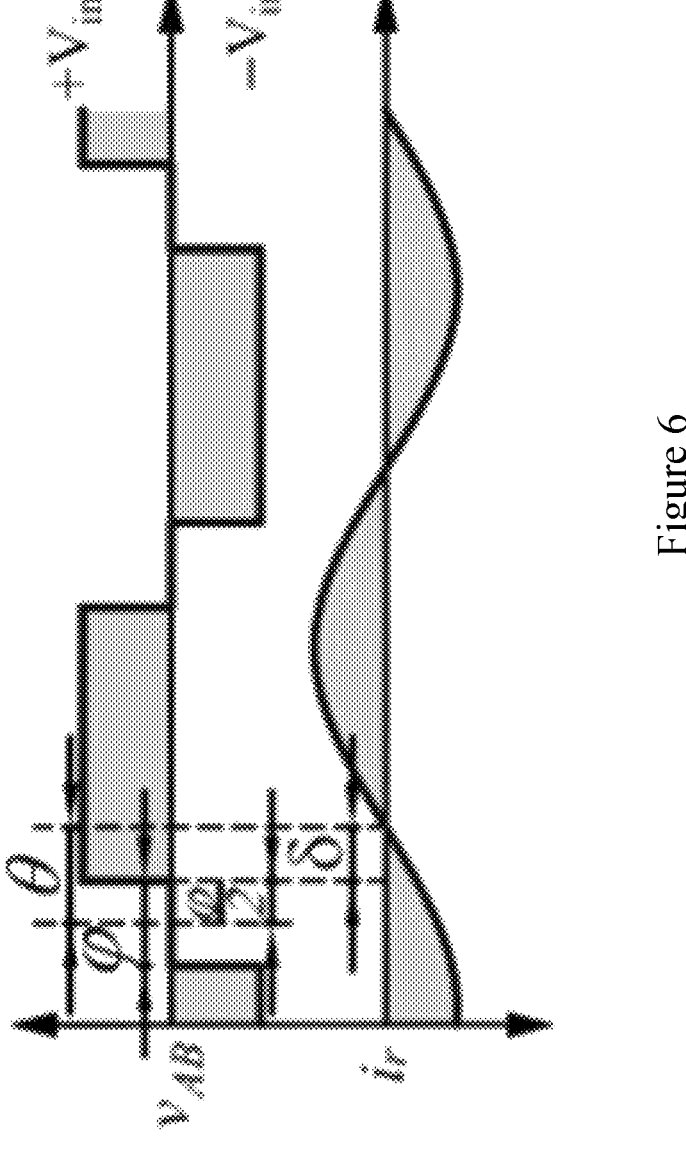
FIG. 6 is a graphic depiction of phase-shift controlled LLC resonant converter input voltage and current.

Referring to FIG. 6, while the impedance angle is θ, the actual angle between the zero-crossings of the voltage and current is δ.

When phase-shift control is used the actual angle between zero crossings of the voltage and current is determined as δ. Then, to maintain ZVS, δ must be greater than zero where:

$$\delta = \begin{cases} \theta & \text{for } \varphi = 0 \\ \theta - \dfrac{\varphi}{2} & \text{for } 0 < \varphi < \pi \end{cases}$$

The phase-shift angle φ is applied to control the converter gain.

The System Controller and it's subsequent LLC Controller for the grid connected LLC resonant converter uses both switching frequency control and phase-shift control to achieve an output voltage that reduces to zero. The LLC controller adds a phase-shift, p, between two legs of the inverter as shown in FIG. 6. Then the fundamental component of the resonant tank supply voltage is:

$$v_{AB1} = \frac{4}{\pi}\sin\frac{\pi - \varphi}{2}\sin(2\pi f_s t), \ 0 \leq \varphi \leq \pi$$

and is dependent on the phase-shift angle.

Although it is desired to have ZVS across the entire 0 to R operating range this is theoretically impossible. Trade-offs between the designed inductance $L_m$ and $t_d$ can be used to extend the ZVS region.

The LLC converter switching frequency is controlled according to the phase-shift angle to provide a wider ZVS range.

Figure 7:
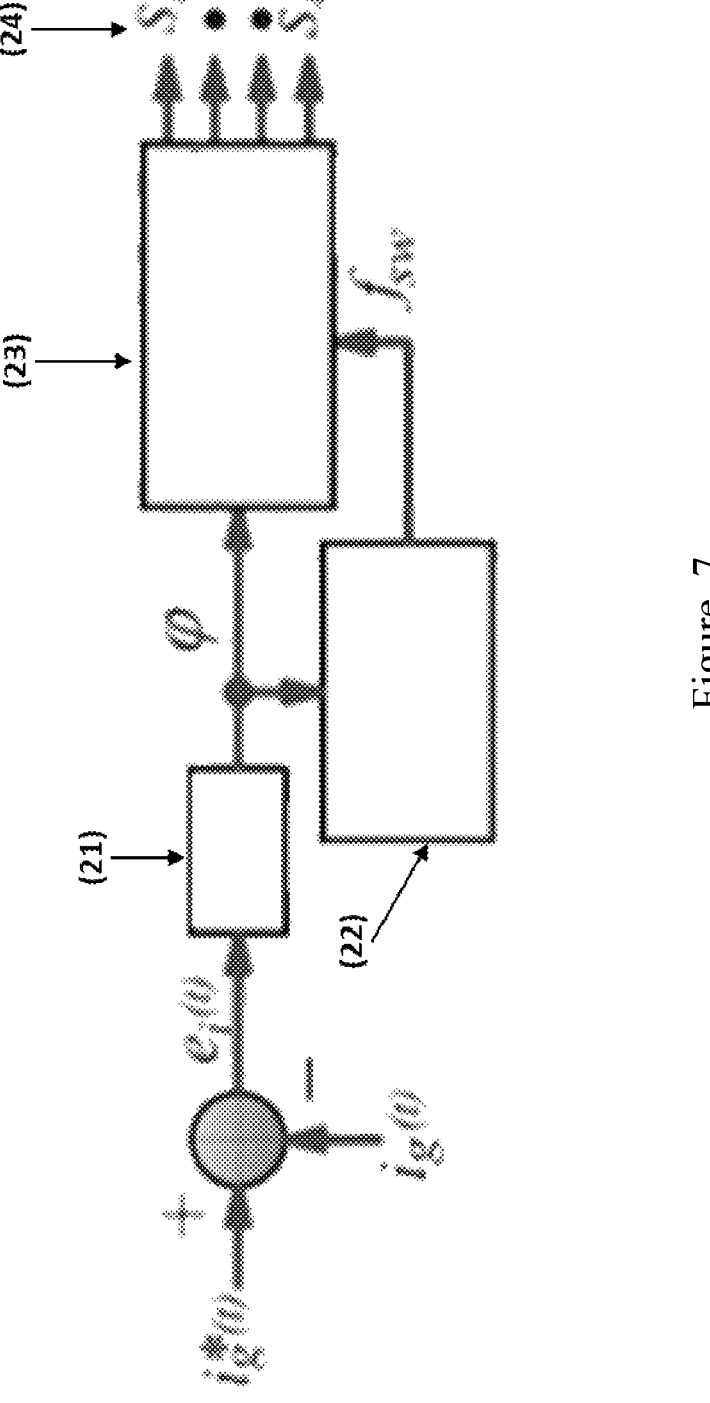
FIG. 7 is a schematic of an LLC resonant converter adaptive PI controller with phase angle and optimal switching frequency control.

Referring to FIG. 7, this control is provided by a PI controller, referred to as PI Phase Shift Control Block (21) in which a switch cycle phase shift angle is calculated and fed into a Switching Control Block (23), which is adjusted based on a proportional gain from the phase-shift angle. The switching frequency is determined from an optimal frequency calculation which is performed in the Frequency Optimization Control Block (22) based on minimizing the system power losses and then fed into the Switching Control Block (23). In the preferred implementation as shown in FIG. 7, the switching frequency is close to the resonant frequency at high currents with a lower phase-shift angle. The switching frequency is increased when the phase-shift increases to track the decreasing reference current signal for each half of the reference output current signal. The output of the PI controller is given by:

$$\varphi(t) = K_p[i_g(t) - i_g(t)^*] + K_i\int[i_g(t) - i_g(t)^*]dt$$

where $i_g(t)$ is the system output current injected into the grid, and $i_g(t)^*$ is the controller reference signal.

Referring back to FIG. 7, since the grid-side inverter stage is operating at twice line frequency as an unfolder, the LLC controller has to regulate and shape the DC bus voltage and current as a rectified sine wave where $i_g(t)^*$ is the reference for the LLC converter output current injected into the grid.

The gain function between the output voltage and the input voltage is given by:

$$M = \frac{V_o}{V_i} = \frac{nf_n^2(m-1)\sin\left(\dfrac{\pi - \varphi}{2}\right)}{\sqrt{\left(mf_n^2 - 1\right)^2 + f_n^2\left(f_n^2 - 1\right)^2(m-1)^2 Q^2}}$$

The output power is given as:

$$P_{out} = \frac{V_o^2}{R_e} = \frac{V_i^2 M^2}{R_e}$$

The optimal switching frequency can be described based on operating point for the total system losses as:

$$P_{loss}=P_W+P_S+P_C$$

where $P_C$ is the transformer core losses, $P_s$ is the switching losses and $P_w$ is the winding and conduction losses.

Combining the $P_{loss}$ function with the constrain function for $P_{out}$ gives:

$$\Lambda(\varphi,f_s,\lambda)=P_{loss}+\lambda P_{out}$$

Based on the Lagrange multiplier method to minimize total losses a constraint function $g(\varphi,f_s)=P_{loss}$ can be determined based on $\varphi$ and $f_s$ as:

$$\frac{\partial \Lambda}{\partial \varphi} = \frac{\partial P_{loss}}{\partial \varphi} + \lambda\frac{\partial P_{out}}{\partial \varphi} = 0$$

$$\frac{\partial \Lambda}{\partial f_s} = \frac{\partial P_{loss}}{\partial f_s} + \lambda\frac{\partial P_{out}}{\partial f_s} = 0$$

Simplifying the optimization control, Λ, the Lagrange Multiplier, is eliminated and the relation between φ and $f_s$ can be easily determined for any specific hardware combination of device type, sizes and transformer configuration driven by direct design implementation requirements (frequency, voltage, current hardware limits) and the simplified constraint function. This simplified optimization calculation is carried out with in the Frequency Optimization Control Block (22) and the two signals, Phase Shift PI Control Block (21) and Frequency Optimization Control Block (22) are combined in a Switching Control Block (23) to produce the Inverter H-Bridge Commutation Commands (24).

Figure 8:
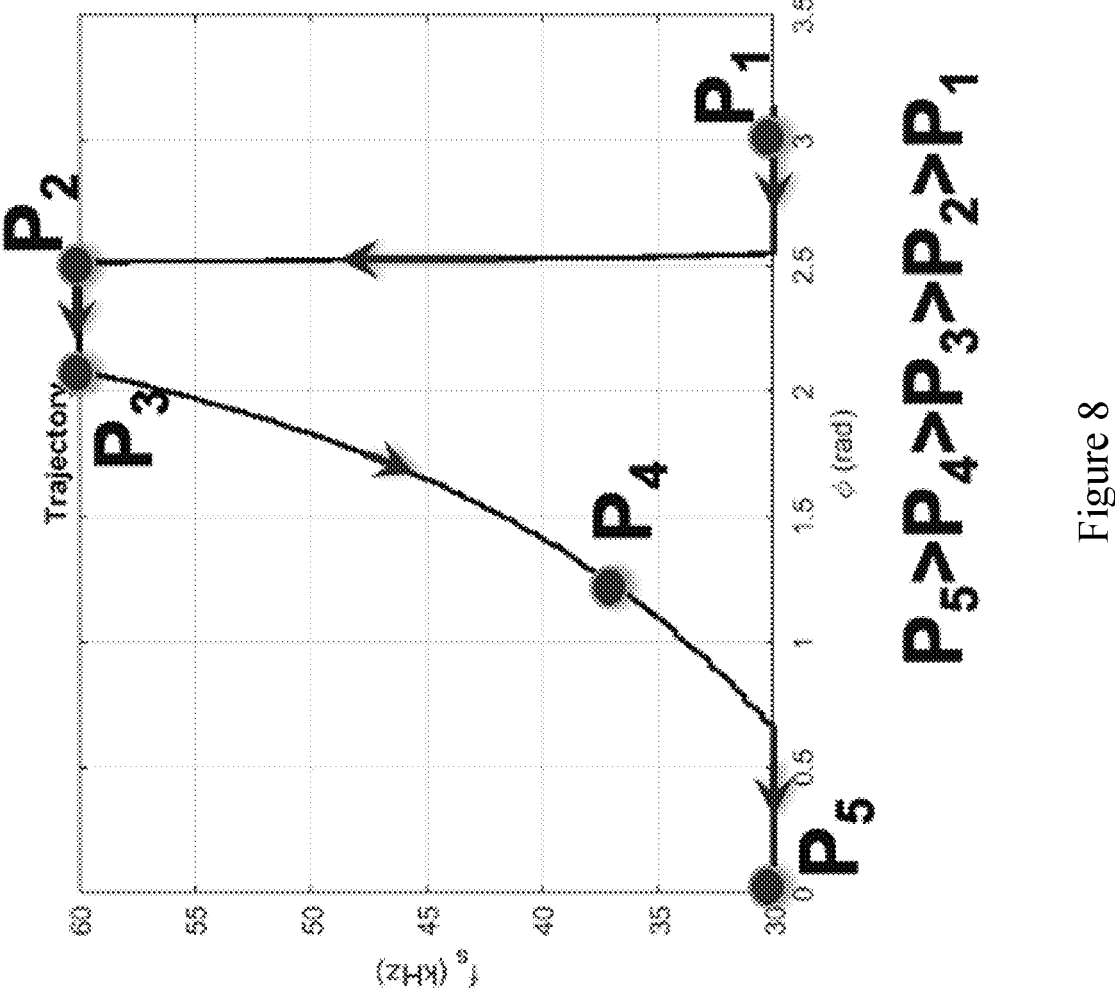
FIG. 8 is a graph presenting the optimal phase angle, φ, and switching frequency, fs control trajectory, when considering switching frequency constraint, wherein P is the relative power demand of the grid.

Referring to FIG. 8, this can be directly translated to a simplified optimization function which actively determines the optimal $f_s$–φ trajectory, at any system operating point (Power Demand), thus delivering minimum system power losses.

As the phase angle increases the switching frequency also increases until the switching frequency is clamped at a maximum value. As the phase angle further increases the switching frequency drops to a minimum value due to the increase in losses due to switching frequency where the lower switching frequency provides better efficiency.

The scope of this application is not limited to the specific embodiments described herein. Rather, the claims should be looked to in order to judge the full scope of the invention.

The invention claimed is:

1. A method of power conversion within a system comprising:

providing a System Controller including a modified adaptive LLC controller, a LLC resonant inverter, and an unfolding inverter controller, wherein the system controller provides input, output, and logic functions to operate the modified adaptive LLC controller, LLC resonant inverter and unfolding inverter controller within the System Controller, and, providing a physical power structure including, three LLC resonant inverters, wherein each resonant inverter is implemented with a high voltage isolation transformer having a secondary that is connected to a rectifier and the unfolding inverter controller within the System Controller, configuring the output of the resonant inverters as a three phase system controlled by the System Controller;

wherein the adaptive LLC controller is an adaptive PI LLC controller that generates a switching frequency including a rectified sine wave voltage and current at output of a DC bus, wherein the generation of the switching frequency of the adaptive PI LLC controller comprises the steps of:

a) providing a Phase Shift Control Block to calculate and feed a switch cycle shift angle to a Switching Control Block;

b) adjusting the switch cycle shift angle with the Switching Control Block based on an optimal frequency calculation performed by a Frequency Optimization Control Block; and, c) feeding a signal from the Phase Shift Control Block and a signal from the Frequency Optimization Control Block into the Switching Control Block to generate optimized Inverter H-Bridge switch Commutation Commands to provide a wide zero voltage switching range for the system; and, wherein the unfolding inverter controller within the System Controller operates at twice line frequency.

2. The method of power conversion of claim 1, wherein the three phase system is coordinated by the system controller to provide variable amounts of reactive energy and connected to a common three phase grid point.

3. The method of power conversion of claim 1, wherein the three phase system is coordinated by the system controller to provide redundant capacity to a commonly connected grid point as necessary to ride through individual system failures.

4. The method of power conversion of claim 1, wherein the three phase system is coordinated by the system controller to provide additional harmonic compensation to a connected grid point beyond what a single system provides to improved power quality.

5. The method of power conversion of claim 1, wherein an adaptation control function within the System Controller is provided to optimize the PI LLC controller parameters for system stability and efficiency based on monitoring previous system response to power transients.

* * * * *